United States Patent [19]

Durcan

[11] 4,441,727
[45] Apr. 10, 1984

[54] LOAD CARRYING APPARATUS

[76] Inventor: John W. Durcan, 178 Newbrook La., Bay Shore, N.Y. 11706

[21] Appl. No.: 310,385

[22] Filed: Oct. 13, 1981

Related U.S. Application Data

[62] Division of Ser. No. 139,883, Apr. 14, 1980, Pat. No. 4,312,090.

[51] Int. Cl.[3] ...................... B62B 11/00; B62D 21/00; B60S 3/06
[52] U.S. Cl. .................................. 280/62; 280/47.35; 280/79.1 A
[58] Field of Search ............... 280/62, 79.1 R, 79.1 A, 280/29, 32.5, 47.23, 47.34, 47.35; 15/97 B, 103; 180/210

[56] References Cited

U.S. PATENT DOCUMENTS 2,989,320  6/1961  Pennington ...................... 280/47.34
3,641,607  2/1972  Lemelson .......................... 15/103 X
3,941,400  3/1976  Buttner ........................... 280/79.1 A
4,279,565  7/1981  Verdy .............................. 280/62 X

FOREIGN PATENT DOCUMENTS 946,753   8/1956   Fed. Rep. of Germany ........ 280/62
1294223   4/1962   France .................................. 280/62
1373466  11/1974   United Kingdom .......... 280/79.1 A Primary Examiner—Joseph F. Peters, Jr.
Attorney, Agent, or Firm—Marvin Bressler

[57] ABSTRACT

A load carrying apparatus with a movable triangular shaped carriage. The carriage has a cross-member connected to two sides of the triangular carriage. Two load carrying members are provided on the carriage with one member being connected at two points. The first point is located on one side of the triangular shaped carriage and the second point is located on the cross member. The two load carrying members are connected and a load is adapted to be supported by the second load carrying member. The disclosed load is a vehicle cleaning apparatus.

8 Claims, 5 Drawing Figures

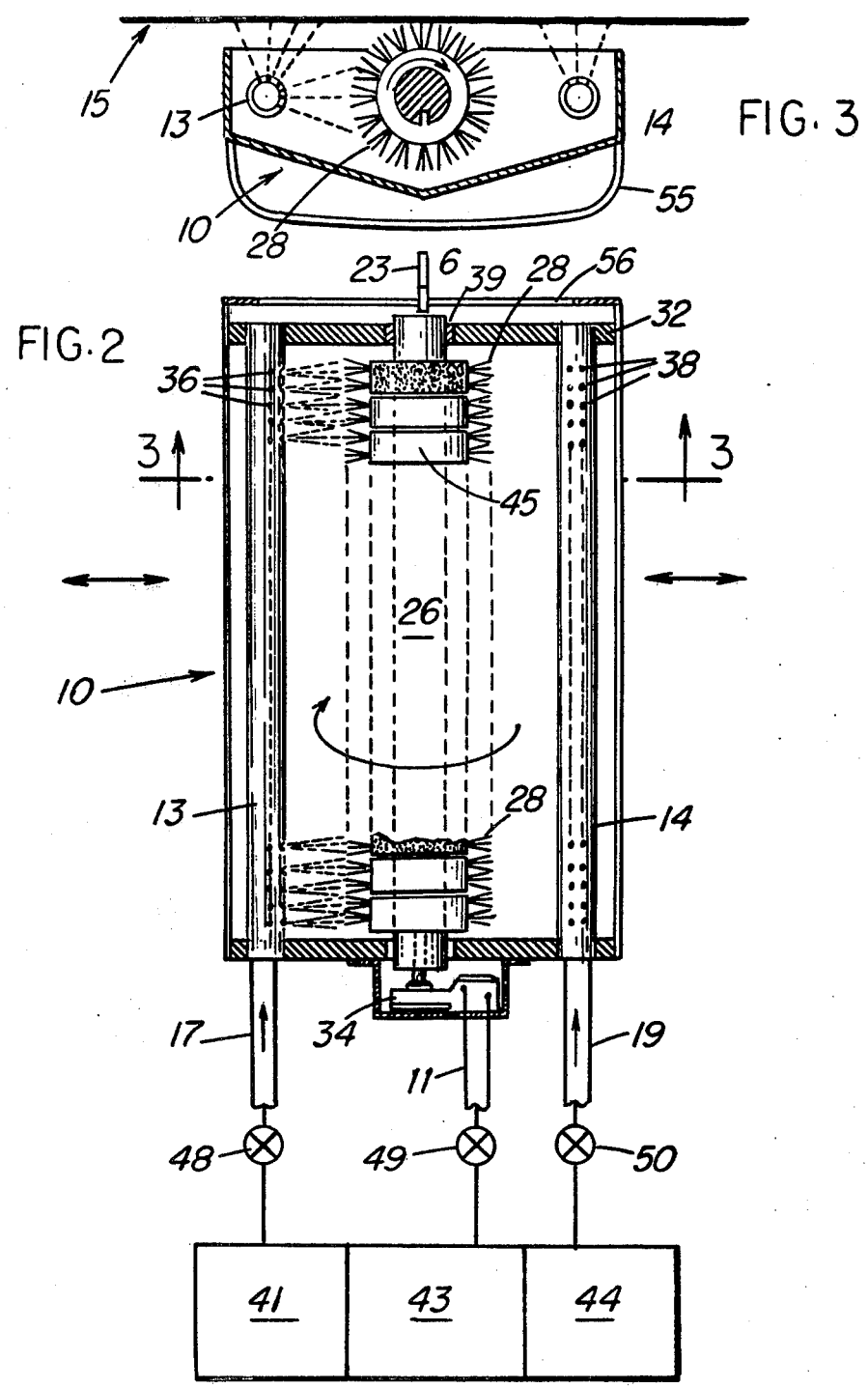

FIG. 4
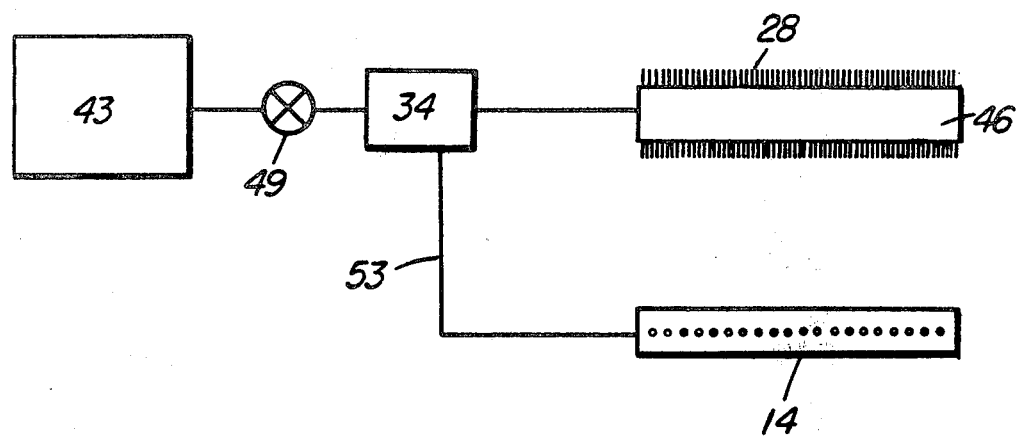
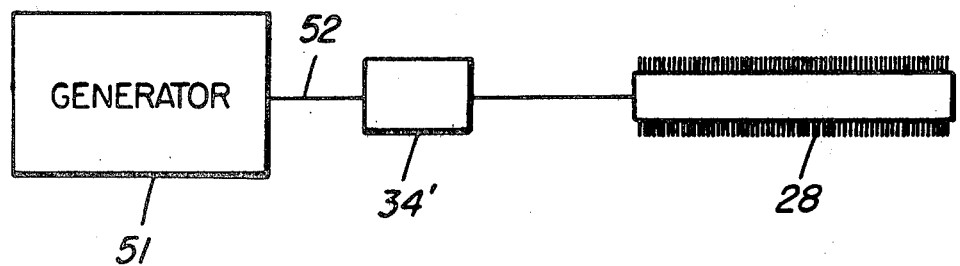
FIG. 5

LOAD CARRYING APPARATUS

This is a division of application Ser. No. 139,883, filed Apr. 14, 1980 now U.S. Pat. No. 4,312,090.

BACKGROUND OF THE INVENTION

1. Field of the Invention

The instant invention is directed to an apparatus for carrying a load from an overhead position. More specifically, the invention is directed to an apparatus for vehicle cleaning, the moveable cleaning apparatus suspended from an overhead position.

2. Description of the Prior Art

Many methods and apparatus have been employed in the past to convey heavy loads from a first to a second position. In general, the more costly the method or apparatus the less labor intensive it is. Thus, either expensive capital equipment or heavy labor costs must be borne.

These factors apply equally to those applications where heavy and/or bulky processing equipment must be quickly moved about. In these instances the ability to quickly move the equipment creates a tradeoff between the expenditure of large sums for capital equipment, to facilitate such movement, and low capital expenditure with the need for heavy labor involvement. A less than satisfactory alternative is less efficient processing with both low capital and labor expenditure. Examples of industries subject to these considerations are the cleaning, scraping, washing, painting, and coating of all types of stationary structures, and moveable vehicles.

A particular example of these considerations is the cleaning of large vehicles. The cleaning of large trucks, trailers, and other large vehicles is a significant industrial activity. There are presently two major methods employed to clean these large vehicles. The first, employed by large fleet operations, is characterized by expensive stationary equipment. This type of cleaning system provides effective cleaning. However, this system includes relatively large scale equipment. Not only is this cleaning system capital intensive, but also, obviously, stationary. That is, the equipment is located at a fixed location, usually indoors. This requires that the vehicle must be transported to this fixed location. Such a requirement is time consuming, oftentimes adversely affecting vehicle usage and schedules. This need to move vehicles to a cleaning site also adds expense in terms of labor and energy. The vehicles must be driven to the fixed cleaning site by a driver using gasoline or diesel fuel.

On the other hand, there are large vehicle cleaning systems available that overcome the disadvantages associated with expensive stationary facilities. These systems are characterized by non-stationary locations for cleaning vehicles. Indeed, one advantage of these systems is that the vehicles can be cleaned at their normal parked location. These systems are characterized by heavy utilization of manual labor for cleaning vehicles. In such a system, cleaning trucks provided with cleaning solutions and rinse water, maintained under pressure, are connected to hoses held by workers who are likewise provided with brushes. The workers clean the trucks by first spraying with cleaning solution followed by brushing and concluding by rinsing.

The advantages of this system, low cost and simple equipments is offset by inefficient cleaning. In most instances, the three step cleaning process is not well coordinated so that often times by the time the worker reaches the vehicle surface sprayed with cleaning solution to brush it, the solution has dried. The result is a vehicle incompletely cleaned.

The discussion above suggests the need for a load carrying apparatus that combines the efficient load carrying and moving capabilities of capital intensive systems with the low cost of labor intensive load carrying systems. It especially suggests this need in industries that are directed to the cleaning, scraping, washing, coating, and painting of stationary structures and moveable vehicles. Most especially it seems particularly important in the cleaning of large vehicles.

SUMMARY OF THE INVENTION

The instant invention is directed to a load carrying apparatus that is characterized by the ability to convey heavy loads rapidly and efficiently without the expense of costly equipment. Additionally, the load carrying apparatus, useful in the construction, cleaning, washing, scraping, coating, and painting industries, does not require any more labor expense than that associated with capital intensive load carrying apparatus.

The instant invention is further directed to a vehicle cleaning apparatus that provides the combined advantages associated with fixed site cleaning systems and mobile cleaning systems. That is, the apparatus of this invention provides low cost, efficient vehicle cleaning.

In accordance with the instant invention, a load carrying apparatus is provided. The apparatus includes a moveable triangular shaped carriage. A cross member is connected to two sides and parallel to the third side of the triangular shaped carriage. A first load carrying member is connected to the underside of the midpoints of the cross member and the side of the carriage parallel to the cross member. A second load carrying member is included in the apparatus. This second member includes a first segment, parallel to the first load carrying member, disposed above the carriage and a second segment perpendicular to the first segment. A connecting member is also provided connecting the first and second load carrying members.

In further accordance with the instant invention, an apparatus for vehicle cleaning is provided. It includes a load carrying means moveable on the roof of a vehicle. The means, as stated above, includes connecting means connected to and suspended downward from said carriage. Cleaning means, also included in the apparatus, is connected to the connecting means, and suspended therefrom along the side of the vehicle.

BRIEF DESCRIPTION OF THE DRAWINGS

The invention may be better understood by references to the accompanying drawings of which:

FIG. 2 a front elevational view of the cleaning apparatus of this invention;

FIG. 3 is a sectional view taken along plane 3—3 of FIG. 2;

FIG. 4 is a schematic representation of the fluid transport system illustrating an alternate embodiment of this invention;

and

Figure 1:
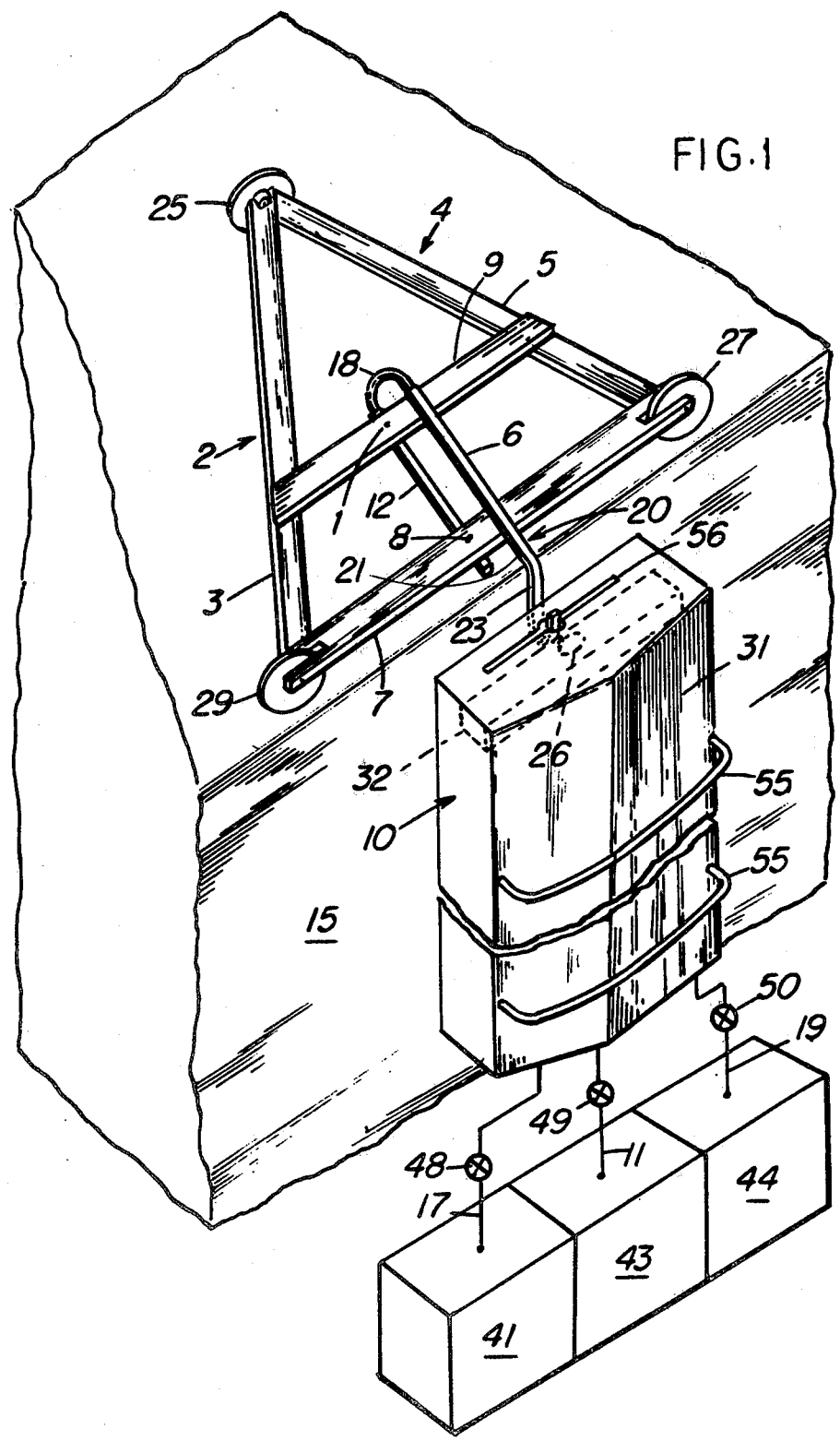
FIG. 1 is perspective view of the load carrying and cleaning apparatus of this invention.

FIG. 5 is a schematic representation of an electrical conductive scheme illustrating another alternate embodiment of this invention.

DETAILED DESCRIPTION

Turning to the drawings in detail, the load carrying apparatus is generally indicated at 4. It includes a moveable triangular shaped carriage, designated generally by reference numeral 2. The carriage comprises first, second, and third members 3, 5, and 7 respectively, which define its triangular shape. It is required that at least two members, 3 and 5, be of equal length such that the triangular carriage 2 be in the shape of an isosceles triangle. A cross member 9 is connected to the members 3 and 5 having sides of equal length. The cross member 9, parallel to the third member 7, is coincident with, or in immediate proximity to, an imaginary plane defining the center of gravity of the carriage 2.

The three members 3, 5, and 7 as well as cross member 9 may be formed as a single integral structural. Alternately, the members 3, 5, and 7 and cross member 9 may be connected to each other. The members may be connected to each other by such means as by riveting, bolting, brazing, or welding. Indeed, any combination of integral and connecting construction is within the contemplation of this invention. The cross member 9, for example, instead of being integrally formed with an integrally formed carriage 2 may be connected to the members 3 and 5. In another example, the cross member 9 is integrally formed with members 3 and 5 which, in turn, may be connected to the third member, member 7.

The load carrying apparatus 4 includes load carrying means generally indicated at 6. The means 6 includes a first load carrying member 12. Member 12 is attached to the midpoint, or proximite to the midpoint of the underside of cross member 9 and member 7 of the carriage 2, which is parallel to cross member 9, at points 1 and 8 respectively. Any method that attaches member 12 to members 7 and 9 may be used, for example, by welding, riveting, bolting, or adhesion. The first load carrying member 12 extends beyond the cross member 9 to facilitate communication with the second load carrying member 20.

The first load carrying member 12 is connected by suitable connecting means, such as by bolting, or riveting at its end just beyond cross member 9 to a connecting member 18. Connecting member 18, the second component of the load carrying means 6, is a U-shaped member disposed in a fashion such that the ends of the U are disposed at different elevations.

Connecting member 18 provides communication with the third component of the load carrying means 6. The third component is a second load carrying member 20. Member 20 is fastened or connected to the connecting member 18 by the same means employed to fasten or connect first load carrying member 12 to the U-shaped member 18. Thus, load communication is provided between the first and second load carrying members by means of the bendable connecting member 18.

The second load carrying member 20 includes a first segment 21 which is disposed above the carriage 2. It is a horizontal segment generally parallel to the first load carrying member 12. One end of segment 21 is connected to the connecting member 18. The other end of the segment extends at least beyond an imaginary vertical plane parallel to the member 7 of the carriage 2.

A second segment 23 of the member 20, integral with the first segment 21, is normal to the first segment 21, bent downward at an angle of 90° from the segment 21. The second segment 23 has no definite length. However, it is preferred that this vertical segment extend beyond an imaginary horizontal plane parallel to member 7 of the carriage 2.

It is noted that the connection of the first load carrying member 12 to the underside of cross member 9 at point 1 is theorized to be critical. Although, the invention is not in any way limited by the accuracy of this theory, it is believed that that point is at the center of gravity of the carriage 2. As such it is thought that all loads attached to the second load carrying member 20 are imposed at point 1 which is at or close to the center of gravity of the carriage 2. Thus, loads imposed directly downward on the center of gravity of the carriage 2 impose no unbalanced load thereupon.

Each corner of the triangular carriage 2 is provided with wheels 25, 27, and 29. The wheels may be of any construction suitable to the application to which the load carrying apparatus is put. For example, the wheels may be inflated in the event the carriage is disposed on a rough or irregular surface as, for example, a corrugated surface. Coasters or other suitable means, connected to the carriage members, may be provided to accommodate these wheels.

The material of construction of the load carrying apparatus 4 may be any sufficiently strong, but reasonable light material, sufficient to the load carrying task. Light weight metals, especially aluminum, are particularly preferred. Other metals within the contemplation of this invention include titanium and light weight metal alloys. Also, high strength plastics, known as engineering plastics, are within the contemplation of this invention. Such plastics as nylons polyesters, phenolics, polyacetals, polycarbonates and the like may be used in the construction of the apparatus 4.

Although, it is not essential, in a preferred embodiment of this invention all components of the load carrying apparatus 4 are constructed of the same light weight material with the exception of the connecting member 18, to be discussed below. This includes the members 3, 5, and 7 which comprise the carriage 2, the cross member 9 and the first and second load carrying members 12 and 20. In a preferred embodiment all the above-recited members are constructed of aluminum.

The above mentioned exception, the U-shaped connecting member 18, must be very strong and flexible. Thus, a ductile type steel is especially preferred. Because connecting member 18 is preferably steel whereas members 12 and 20 are preferably a light weight material such as aluminum, it is preferred to connect member 18 to the first and second load carrying members 12 and 20 by either bolts or rivets. Welding of steel with an unlike material, such as aluminum, is difficult.

In a preferred embodiment all components of the load carrying apparatus 4 are rectangular in cross-section. Of course, other cross-sectional configurations for these members are within the contemplation of this invention. Thus, the cross section can be circular, square, triangular, T-shaped, L-shaped or the like. An exception is again the connecting U-shaped member 18. The U-shaped connecting member 18 is preferably of circular cross-section. It is postulated that a circular cross-section provides optimum strength, a prime requirement of the U-shaped connecting member.

In operation the load is attached to segment 23 of the second load carrying member 20. The load is moved by movement of the load carrying apparatus 4 disposed above the load. The load, attached to segment 23, however, must not cross the imaginary vertical plane extending downward from the member 9. Although, the invention is not dependent on the following theory, it is thought that the load becomes part of the apparatus 4 whose center of gravity remains at point 1 the point where the first load carrying member 12 is connected to cross member 9. If the load moves horizontally beyond the imaginary vertical plane which intersects member 9, the center of gravity of the total system, equilibrium of the apparatus 4 is upset and the apparatus is thus toppled.

In the preferred embodiment wherein the load carrying apparatus is a member of a vehicle cleaning apparatus, depicted generally in FIG. 1, the load carrying member 4 is disposed on the roof of a truck trailer 15 or other like vehicle. Vehicle cleaning means, generally depicted at 10, is suspended from the member 4. An operator (not shown) is employed to move the cleaning means 10 along the side of the vehicle 15. To this end handles 55 may be provided. Two handles 55 are preferably provided. Both handles 55 are attached to a shield 31 extending from one end of the shield to the other. In the preferred embodiment wherein two handles 55 are provided, one handle is disposed at or near the bottom of the apparatus 10. The other handle is parallel to the bottom handle but up approximately one-third the way up from the bottom. This handle disposition provides the most convenient arrangement for operator handling of the vehicle cleaning means 10. A support means provides energy to power brushing means and supply soaping and rinsing solutions for use with the means 10.

The vehicle cleaning means 10 is connected to the aforementioned load carrying member 4 by means of the second load carrying member 20. In the preferred embodiment, illustrated in the drawings, segment 23 of the member 20 is connected to the cleaning apparatus 10 by terminating in the shape of a hook which is accomodated in a slot 56 provided on the top portion of the shield 31. It is noted that other embodiments to connect member 20 to cleaning apparatus 10 may be used instead of the one described above and illustrated in the drawings. These other embodiments may include the use of additional connecting members communicating between member 20 and apparatus 10. These other embodiments, with or without additional connecting members, may provide connection between the load carrying member 4 and vehicle cleaning apparatus 10 by means other than by hooking, such as by welding, bolting, riveting or the like.

The above described shield 31 may be, as illustrated in the drawings, a hollow six-sided body. Other shapes which shield liquids, such as a hollow triangular shape, a hollow semi-circular shape, a rectangular shape or the like may easily be substituted for the embodiment illustrated in the drawings. A support means, which may in one preferred embodiment be a truck, provides the vehicle cleaning means 10 with soaping means. The soaping means includes a soaping manifold 13 provided with a plurality of openings 36. The manifold 13 is a hollow cylinder or other shaped conduit characterized by the openings 36 aimed at the side of the vehicle to be cleaned. In preferred embodiment additional orifices 36 are targeted at a plurality of bristles 28 of brushing means to be discussed later. A soaping solution conduit 17, in communication with the soaping manifold 13, supplies the soaping solution to the manifold. The soaping solution, in a preferred embodiment, is provided in a compartment, another component of the soaping means, denoted in the drawings at 41. The compartment 41 is preferably provided on the support means.

The soaping solution is a conventional aqueous soap or detergent solution well known in the art. The solution is pressurized to a pressure in the range of between about 100 and 500 pounds per square inch, more preferably in the range of between about 200 and 300 pounds per square inch.

This pressure may be internally supplied by compressor means provided with the support means such that the compartment 41 is a pressurized chamber. Alternatively, the compartment may be kept at atmospheric pressure with compressor means provided downstream of the compartment 41 and upstream of control means controlling flow to the manifold 13. Control means, exemplified in the drawing by control valve 48, are disposed in the conduit 17 to control the flow to manifold 13 which in turn controls the flow of the soap solution to the vehicle 15 being cleaned.

An analogous scheme is employed to provide rinsing means on the vehicle cleaning means 10. The rinsing means includes compartment 44 preferably provided on the support means. Compartment 44 is filled with water provided at a pressure in the range of between about 300 and 1000 psia, more preferably between about 400 and 600 psia. As in the case of the soaping means, the pressurized water may be provided by compressor means included in the support means or alternatively by a separate compressor or the like provided downstream of the compartment 43. A conduit 19 for the rinse water communicates between compartment 44 and a rinsing manifold 14. Rinsing manifold 14, in a preferred embodiment, is a duplicate of soaping manifold 13. Thus, the manifold 14 is preferably a hollow cylindrically shaped structure. It differs from the soaping manifold 13 only in the direction of flow from the plurality of openings 38 provided on the manifold 14. The orifices 38 are of the same size and shape as orifices 36 on manifold 13. However, holes 38 are aimed directly downward and away from the opposite side of the apparatus 10. That is, the rinse flow is away from the soap stream. In addition, no rinse water is aimed at the brushes.

As in the case of the soaping means, communication between compartment 44 and the rinsing manifold 14 is controlled by one or more valves. The drawings illustrate an embodiment utilizing a single control valve, valve 50.

The vehicle cleaning means 10 additionally includes brushing means. The brushing means includes a shaft 26 stationed in the center of apparatus 10 midway between the soaping and rinsing manifolds 13 and 14. The rotating shaft 26 extends through an opening in an overhead member 32. It is noted that overhead member 32 provides the structural strength to carry the load imparted by manifolds 36 and 38. A bearing 39 is disposed in the opening in member 32 to accommodate the shaft 26. Attached to the shaft 41 are a multiplicity of brushing discs 45 each provided with a plurality of bristles 28. The rotatable cylindrical shaft 26 is in one preferred embodiment powered by conventional fluid pressure means. That is, a fluid, in a preferred embodiment, water, rotates the shaft 26 to turn the bristle 28 attached to discs 40 disposed on shaft 26.

To provide fluidized pressure as a means of rotating shaft 26, pressurized chamber 43 may be provided in the support means. The chamber 43 is filled with water maintained at a pressure in the range of between about 700 and 1400 psia, more preferably, between about 800 and 1200 psia. As in the case of the soaping and rinsing means, in an alternate preferred embodiment, the water is not pressurized in compartment 43 but rather is pressurized, by compressor means, downstream of compartment 43. In either case flow of the pressurized water is controlled by control valve means, illustrated in the drawings by valve 49. The valve 49 is disposed in a conduit 11 which communicates between the source of the water compartment 43 and a hydraulic motor 34. The hydraulic motor 34 is a conventional motor, well known in the art, for converting the energy of high pressure liquids, in this case water, into useful work, i.e., turning the shaft 26.

It is noted that the embodiment in which a slot 56 is provided permits cleaning of ends of the truck side 15. Obviously, the load carrying member 20 cannot extend completely to the end of the truck or trailer side. By providing the slot 56 the apparatus 10 can independently be moved by sliding the hook along slot 56 to cover the ends of the side of the truck 15.

Another embodiment illustrated in FIG. 4 combines the rinsing means with the brushing means. In this embodiment, water exiting hydraulic motor 34 is conducted through a conduit 53 into rinsing manifold 14. In this embodiment water pressure in compartment 43 is maintained in the range of between about 700 psia and 1400 psia, more preferably between about 800 and 1200 psia. Obviously, in this embodiment, the need for separate compartment 44 is eliminated.

In another preferred embodiment, illustrated in FIG. 5, electrical power means are employed instead of the hydraulic power means depicted in FIGS. 1-3 to power the brushing means. In this alternate preferred embodiment support means are provided with DC electrical generating means 51, which communicates by means of electrical conducting conduit 52 to a DC motor 34'. The motor powered by this DC power rotates the shaft 26.

As stated above the support means which includes at least two compartments for separated containment of a soap solution and water, preferably under pressure, in an alternate embodiment, comprises three compartments, one for a soap solution and two for water. In yet another alternate embodiment electrical generating means are provided and the two compartments are in a preferred embodiment disposed in a support truck. By providing the support means in the form of a truck mobility is enhanced. It is further noted that in the preferred embodiment wherein the support means is a support truck and wherein DC generating means are employed to power the rotation of the shaft 26 of the brushing means, the DC motor 53 is preferably 12 volts. Thus, the power generated by the generator of a conventional internal combustion truck engine can be used to power the brushing means.

As in the case of the load carrying apparatus 4 most components of the vehicle cleaning apparatus 10 are constructed of aluminum. Aluminum provides an excellent combination of high strength and low weight. Of course, other materials having similar strength-weight characteristics may be used in place of aluminum. Obviously, certain non-structural components in preferred embodiments such as electrical conduit 52, which is preferably copper coated with a suitable insulator, the bristles, which may be a natural product or a synthetic fiber such as nylon are not constructed of a high strength-low weight material such as aluminum.

In operation, the carriage 4 is disposed on the roof of the vehicle 15 to be cleaned. The vehicle cleaning apparatus 10 is suspended from the carriage 4, as described above, along the side of the truck 15. A worker holds the apparatus 10 against the side of the truck 15.

The apparatus is put in operation by opening the valves in the conduits communicating to the soaping and rinsing manifolds. At the same time, the brushing means is powered by either electrical or water power. The apparatus 10 held by the operator by the handles 55 is moved back and forth. as illustrated by the arrows in the drawings. Soap solution is sprayed onto the face of the truck 15 by means of orifices 36. In addition soap solution may also be sprayed onto the bristles 28. The bristles 28 scrub the soaped truck surface. The dirt entrained in the soap solution is rinsed by the water flowing through the orifices 38.

The preferred embodiments described above illustrate the scope and spirit of the instant invention. These embodiments will make apparent, to those skilled in the art, other embodiments within the scope of this invention. Thus, the instant invention should be limited only by the appended claims.

What is claimed is:

1. A load carrying apparatus comprising:
   a moveable triangular shaped carriage disposed at an elevation above the load to be conveyed;
   a cross-member connected to two sides of said triangular shaped carriage, said two sides being of equal length, and parallel to the third side of said triangular shaped carriage;
   a first load carrying member connected to the underside of the midpoint of said cross-member and the underside of the midpoint of said side of said triangular shaped carriage parallel to said cross member, said first load member extending slightly beyond said cross-member;
   a second load carrying member have a first segment, parallel to said first load carrying member disposed above said carriage and a second segment, disposed downward from said carriage, perpendicular to said first segment; in communication with said load;
   a connecting member connecting said first and second load carrying member.

2. An apparatus in accordance with claim 1 comprising wheels attached to the three corners of said carriage.

3. An apparatus is accordance with claim 1 wherein said connecting member is U-shaped and constructed of a high strength material.

4. An apparatus in accordance with claim 1 wherein said carriage, said cross-member, and said first and said second load carrying members are constructed of a low weight, high strength material.

5. An apparatus in accordance with claim 4 where said low weight, high strength material is aluminum.

6. An apparatus according to claim 1 wherein said second load carrying member is connected to a load.

7. An apparatus in accordance with claim 1 wherein said moveable carriage has the shape of an equilateral triangle.

8. An apparatus in accordance with claim 1 wherein said cross-member is coincident with an imaginary plane defining the center of gravity of said triangular shaped carriage.

* * * * *